United States Patent
Ovshinsky et al.

(10) Patent No.: US 6,328,821 B1
(45) Date of Patent: *Dec. 11, 2001

(54) MODIFIED MAGNESIUM BASED HYDROGEN STORAGE ALLOYS

(75) Inventors: Stanford R. Ovshinsky, Bloomfield Hills; Rosa T. Young, Troy, both of MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,812

(22) Filed: Nov. 22, 1999

(51) Int. Cl.[7] .............................. C22C 23/00; H01M 8/18
(52) U.S. Cl. ......................... 148/420; 420/402; 420/405; 420/407; 420/900; 75/255
(58) Field of Search ..................................... 420/900, 402, 420/407, 405; 148/420; 429/19, 20; 75/255

(56) References Cited

U.S. PATENT DOCUMENTS 5,199,972 * 4/1993 Bogdanovic .
5,278,001 * 1/1994 Ono et al. .
5,964,965 * 10/1999 Schulz et al. .
5,976,276 * 11/1999 Sapru et al. .
6,193,929 * 2/2001 Ovshinsky et al. .

* cited by examiner

Primary Examiner—Roy King
Assistant Examiner—Harry D. Wilkins, III
(74) Attorney, Agent, or Firm—David W. Schumaker; Marvin S. Siskind (57) ABSTRACT

A magnesium based hydrogen storage alloy powder which is useful as a hydrogen supply material for powering internal combustion engine or fuel cell vehicles. The alloy contains greater than about 85 atomic percent magnesium, about 2–8 atomic percent nickel, about 0.5–5 atomic percent aluminum and about 2–7 atomic percent rare earth metals or mixtures of rare earth metals. The rare earth elements may be Misch metal and may predominantly contain Ce and/or La. The alloy may also contain about 0.5–5 atomic percent silicon. The alloys can be modified to store more than 4 wt. % hydrogen, with a reduced hydride bond strength (i.e. about 64 kJ/mole) which allows for economic recovery of the stored hydrogen. Also, they have a plateau pressure about two times greater than pure Mg and comparable bond energies and plateau pressures to $Mg_2Ni$ alloys, while reducing the amount of incorporated nickel by 25–30 atomic %. Also, the storage capacity of the alloy is significantly greater than the 3.6 wt. % of $Mg_2Ni$ material.

31 Claims, 9 Drawing Sheets

MODIFIED MAGNESIUM BASED HYDROGEN STORAGE ALLOYS

FIELD OF THE INVENTION

The instant invention relates generally to hydrogen storage alloys and more precisely alloys which are useful as a hydrogen supply material for powering internal combustion engine or fuel cell vehicles. Specifically the invention relates to modified Mg based hydrogen storage alloys. The inventors have for the first time produced Mg based alloys having both hydrogen storage capacities higher than about 4 wt. %, a plateau pressure equivalent to $Mg_2Ni$, and a low heat of formation by atomic engineering the Mg alloy and tailoring the local atomic environment thereof.

BACKGROUND OF THE INVENTION

In the past considerable attention has been given to the use of hydrogen as a fuel or fuel supplement. While the world's oil reserves are rapidly being depleted, the supply of hydrogen remains virtually unlimited. Hydrogen can be produced from coal or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable lightweight hydrogen storage medium. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas weighs about thirty times the weight of a container of gasoline.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253 degree C., and is highly volatile if spilled. Moreover, liquid hydrogen is expensive to produce and the energy necessary for the liquefaction process is a major fraction of the energy that can be generated by burning the hydrogen.

Storage of hydrogen as a solid hydride can provide a greater percent weight storage than storage as a compressed gas or a liquid in pressure tanks. Also, hydrogen storage in a solid hydride presents fewer safety problems than those caused by hydrogen stored in containers as a gas or a liquid. A desirable hydrogen storage material must have a high storage capacity relative to the weight of the material, a suitable desorption temperature, good kinetics, good reversibility, resistance to poisoning by contaminants including those present in the hydrogen gas and be of a relatively low cost. If the material fails to possess any one of these characteristics it will not be acceptable for wide scale commercial utilization.

A high hydrogen storage capacity per unit weight of material is an important consideration in applications where the hydride does not remain stationary. A low hydrogen storage capacity relative to the weight of the material reduces the mileage and hence the range of the vehicle making the use of such materials impractical. A low desorption temperature is desirable to reduce the amount of energy required to release the hydrogen. Furthermore, a relatively low desorption temperature to release the stored hydrogen is necessary for efficient utilization of the available exhaust heat from vehicles, machinery, or other similar equipment.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

The prior art metallic host hydrogen storage materials include magnesium, magnesium nickel, vanadium, iron-titanium, lanthanum pentanickel and alloys of these metals. No prior art material, however, has all of the required properties required for a storage medium with widespread commercial utilization.

Thus, while many metal hydride systems have been proposed, the Mg systems have been heavily studied ever since hydrogen storage was first reported in $Mg_2Ni$. The Mg systems are of high interest because of their large hydrogen storage capacity. However, as discussed above, Mg hydrogen storage systems have not been used commercially to date because of the disadvantages inherent therein.

While magnesium can store large amounts of hydrogen, it's primary disadvantages are high absorption-desorption temperature, low plateau pressure, extremely slow kinetics and large heat of hydride formation (~75 kJ/mol). For example, magnesium hydride is theoretically capable of storing hydrogen at approximately 7.6% by weight computed using the formula: percent storage=H/H+M, where H is the weight of the hydrogen stored and M is the weight of the material to store the hydrogen (all storage percentages hereinafter referred to are computed based on this formula). While a 7.6% storage capacity is suited for on board hydrogen storage for use in powering vehicles, magnesium's other hydrogen storage characteristics make it commercially unacceptable for widespread use.

Magnesium is very difficult to activate. For example, U.S. Pat. No. 3,479,165 discloses that it is necessary to activate magnesium to eliminate surface barriers at temperatures of 400° C. to 425° C. and 1000 psi for several days to obtain a reasonable (90%) conversion to the hydride state. Furthermore, desorption of such hydrides typically requires heating to relatively high temperatures before hydrogen desorption begins. The aforementioned patent states that the $MgH_2$ material must be heated to a temperature of 277° C. before desorption initiates, and significantly higher temperatures and times are required to reach an acceptable operating output. The high desorption temperature makes the magnesium hydride unsuitable for many applications, in particular applications wherein it is desired to utilize waste heat for desorption such as the exhaust heat from combustion engines.

Mg-based alloys have been considered for hydrogen storage also. The two main Mg alloy crystal structures investigated have been the $A_2B$ and $AB_2$ alloy systems. In the $A_2B$ system, $Mg_2Ni$ alloys have been heavily studied because of their moderate hydrogen storage capacity, and lower heat of formation (64 kJ/mol) than Mg. However, because $Mg_2Ni$ has a storage capacity of only 3.6 wt. % hydrogen, researchers have attempted to improve the hydrogenation properties of these alloys through mechanical alloying, mechanical grinding and elemental substitutions. For instance, in U.S. Pat. Nos. 5,506,069 and 5,616,432 (the disclosures of which are incorporated herein by reference), Ovshinsky et al, have modified non-Laves phase Mg-Ni alloys for electrochemical work.

More recently, investigators have attempted to form $MgNi_2$ type alloys for use in hydrogen storage. See Tsushio et al, Hydrogenation Properties of Mg-based Laves Phase Alloys, *Journal of Alloys and Compounds,* 269 (1998), 219–223. Tsushi et al. determined that no hydrides of these alloys have been reported, and they did not succeed in modifying $MgNi_2$ alloys to form hydrogen storage materials.

Finally some work has been done on high Mg content alloys or elementally modified Mg. For instance, in co-pending U.S. application Ser. No. 09/066,185, now U.S. Pat. No. 5,976,216, Sapru, et al have produced mechanically alloyed Mg-Ni-Mo materials containing greater than about 80 atomic percent Mg, for thermal storage of hydrogen. These alloys are formed by mixing the elemental ingredients in the proper proportions in a ball mill or attritor and mechanically alloying the materials for a number of hours to provide the mechanical alloy. While these alloys have improved storage capacities as compared with $Mg_2Ni$ alloys, they have low plateau pressures.

Another example of modified high Mg content alloy is disclosed in U.S. Pat. No. 4,431,561 ('561) to Ovshinsky et al., the disclosure of which is hereby incorporated by reference. In the '561 patent, thin films of high Mg content hydrogen storage alloys were produced by sputtering. Once again, while these materials had high storage capacities, their plateau pressures were low, thus not providing adequate hydrogenation properties.

In U.S. Pat. No. 4,623,597 ("the '597 patent"), the contents of which are incorporated by reference, one of the present inventors, Ovshinsky, described disordered multicomponent hydrogen storage materials for use as negative electrodes in electrochemical cells for the first time. In this patent, Ovshinsky describes how disordered materials can be tailor made to greatly increase hydrogen storage and reversibility characteristics. Such disordered materials are amorphous, microcrystalline, intermediate range order, and/or polycrystalline (lacking long range compositional order) wherein the polycrystaline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. The disordered material had the desired electronic configurations which resulted in a large number of active sites. The nature and number of storage sites was designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of catalytically active sites for hydrogen dissociation and also of hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

The disorder described in the '597 patent can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

One advantage of the disordered materials of the '597 patent were their resistance to poisoning. Another advantage was their ability to be modified in a substantially continuous range of varying percentages of modifier elements. This ability allows the host matrix to be manipulated by modifiers to tailor-make or engineer hydrogen storage materials with all the desirable characteristics, i.e., high charging/discharging efficiency, high degree of reversibility, high electrical efficiency, long cycle life, high density energy storage, no poisoning and minimal structural change.

These same attributes have not, until now, been achieved for thermal hydrogen storage alloys. Therefore, there has been a strong felt need in the art for high capacity, high plateau pressure/low heat of formation, low cost, light weight thermal hydrogen storage alloy materials.

SUMMARY OF THE INVENTION

The object of the instant invention is a modified magnesium hydrogen storage alloy which is useful as a hydrogen supply material for powering internal combustion engine or fuel cell vehicles The alloys can be modified to store more than 4 wt. %, preferably more than 4.5 wt. %, most preferably more than 5 wt. % hydrogen, with a reduced hydride bond strength (i.e. less than about 64 kJ/mole) which allows for economic recovery of the stored hydrogen. Also, the instant alloys have a plateau pressure about two times greater than pure Mg.

The instant alloys have comparable bond energies and plateau pressures to $Mg_2Ni$ alloys, while reducing the amount of incorporated nickel by 25–30 atomic %. This reduced nickel content greatly reduces cost of the alloy. Also, while the kinetics of the alloy are improved over pure Mg, the storage capacity of the alloy is significantly greater than the 3.6 wt. % of $Mg_2Ni$ material.

In general the alloys contain greater than about 85 atomic percent magnesium, about 2–8 atomic percent nickel, about 0.5–5 atomic percent aluminum and about 2–7 atomic percent rare earth metals, and mixtures of rare earth metals with calcium. The rare earth elements may be Misch metal and may predominantly contain Ce and La. The alloy may also contain about 0.5–5 atomic percent silicon.

DETAILED DESCRIPTION OF THE INVENTION

As discussed above, Mg stores large amounts of hydrogen. However, the kinetics of hydrogen storage in pure Mg are less than desirable. That is, while pure Mg can store upwards of 7.6 wt. % hydrogen, the Mg-H bond is very strong (75 kJ/mol) making release of the stored hydrogen difficult and therefore pure Mg is not a commercially viable hydrogen storage material. The instant inventors have found that, by applying the principles of atomic engineering and tailoring of the local environment, magnesium can be modified to store more than 4 wt. %, preferably more than 4.5 wt. %, most preferably more than 5 wt. % hydrogen, with a reduced hydride bond strength (i.e. less than about 64 kJ/mol) which allows for economic recovery of the stored hydrogen. Also, the instant alloys have a plateau pressure about two times greater than pure Mg. Thus the instant alloys provide commercially viable, low cost, low weight hydrogen storage materials.

The instant alloys have comparable bond energies and plateau pressures to $Mg_2Ni$ alloys, while reducing the amount of incorporated nickel by 25–30 atomic %. This reduced nickel content greatly reduces cost of the alloy. Also, while the kinetics of the alloy are improved over pure Mg, the storage capacity of the alloy is greater than the 3.6 wt. % of $Mg_2Ni$ material.

In general the alloys contain greater than about 85 atomic percent magnesium, about 2–8 atomic percent nickel, about 0.5–5 atomic percent aluminum and about 2–7 atomic percent rare earth metals, and mixtures of rare earth metals. The rare earth elements may be Misch metal and may predominantly contain Ce and/or La. The alloy may also contain about 0.5–5 atomic percent silicon. A couple of examples will help to illustrate the instant invention.

EXAMPLE 1

A modified Mg alloy having the designation FC-23 was made which has the composition: 89.10 at. % Mg, 4.37 at. % Ni, 1.35 At. % Al, and 5.19 at % Mm (1.78 at. % La, 2.54 at. % Ce, 0.50 at. % Nd and 0.37 at. % Pr within the Mg alloy). The alloy was formed by mixing the raw elemental materials in a glove box. The mixture was placed in a graphite crucible and the crucible was placed in a furnace. The crucible had a 1.5 mm boron nitride orifice at the bottom thereof which is plugged by a removable boron nitride rod. The furnace was pumped down to very low pressure and purged three times with argon. The argon pressure withing the furnace was brought up to 1 psi and kept at this pressure as the crucible was heated to 800° C. and held at that temperature for 15 minutes. Once the melt was ready, the boron nitride rod was lifted and argon was injected into the furnace under pressure. The molten alloy flowed out of the graphite crucible through the boron nitride orifice and onto a non-water-cooled, horizontally spinning, copper wheel. The wheel, which spins at about 2500 rpm, solidifies the molten alloy into particles which then bounce off a water-cooled copper cap which covers the spinning wheel, and drop into a stainless steel pan where they gradually cool. Details of the alloy properties are presented below.

EXAMPLE 2

A modified Mg alloy having the designation FC-45 was made which has a composition: 90.04 at. % Mg, 4.12 at. % Ni, 1.24 at. % Al, 1.00 at. % Si and 3.59 at % Mm (1.55 at. % La, 1.71 at. % Ce, 0.30 atomic % Pr, and 0.03 at. % Nd within the Mg alloy). The alloy was formed in the same manner as example 1, however, the furnace temperature was 900° C. and the orifice size was 2.0 mm.

Figure 1:
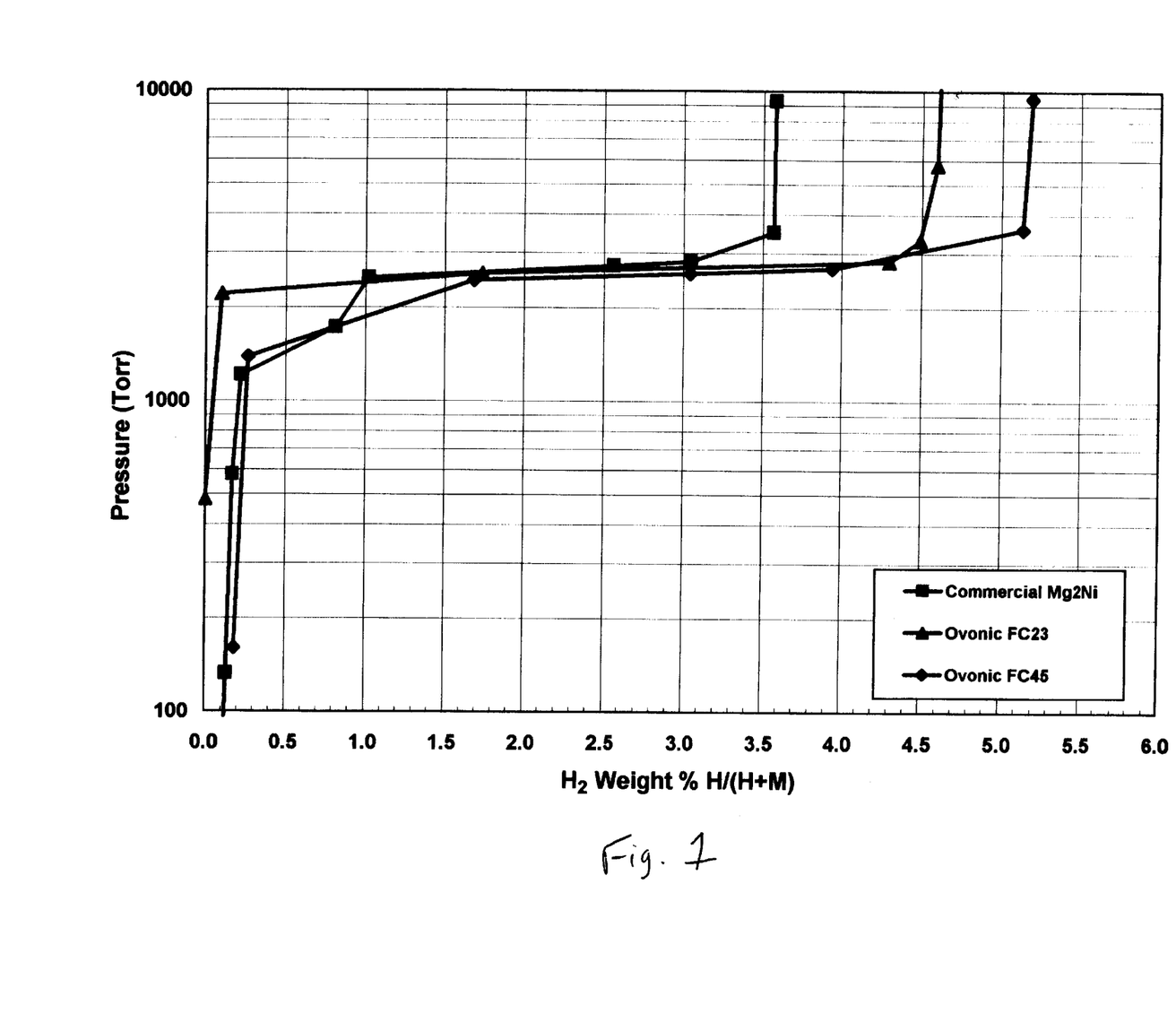
FIG. 1 is a graph of the PCT curves at 300° C. for Mg, $Mg_2Ni$, and two alloys of the instant invention FC-23 and FC-45.

FIG. 1 is a graph of the PCT curves at 300° C. for $Mg_2Ni$ (represented by the □ symbol), the material of example 1, FC-23 (represented by the Δ symbol) and the material of example 2, FC-45 (represented by the ◊ symbol). The alloys of the instant invention have a higher plateau pressure than pure Mg. In fact, they have about the same plateau pressure as $Mg_2Ni$. However, they exhibit storage capacities much higher than the 3.6 wt. % limit of $Mg_2Ni$. The FC-23 material has a storage capacity of about 4.6 wt. % and the FC-45 material has a storage capacity of about 5.2 wt. %. The materials of the instant invention also have lowered bond energies as compared with pure magnesium (i.e. 64 kJ/mol versus 75 kJ/mol).

Figure 2:
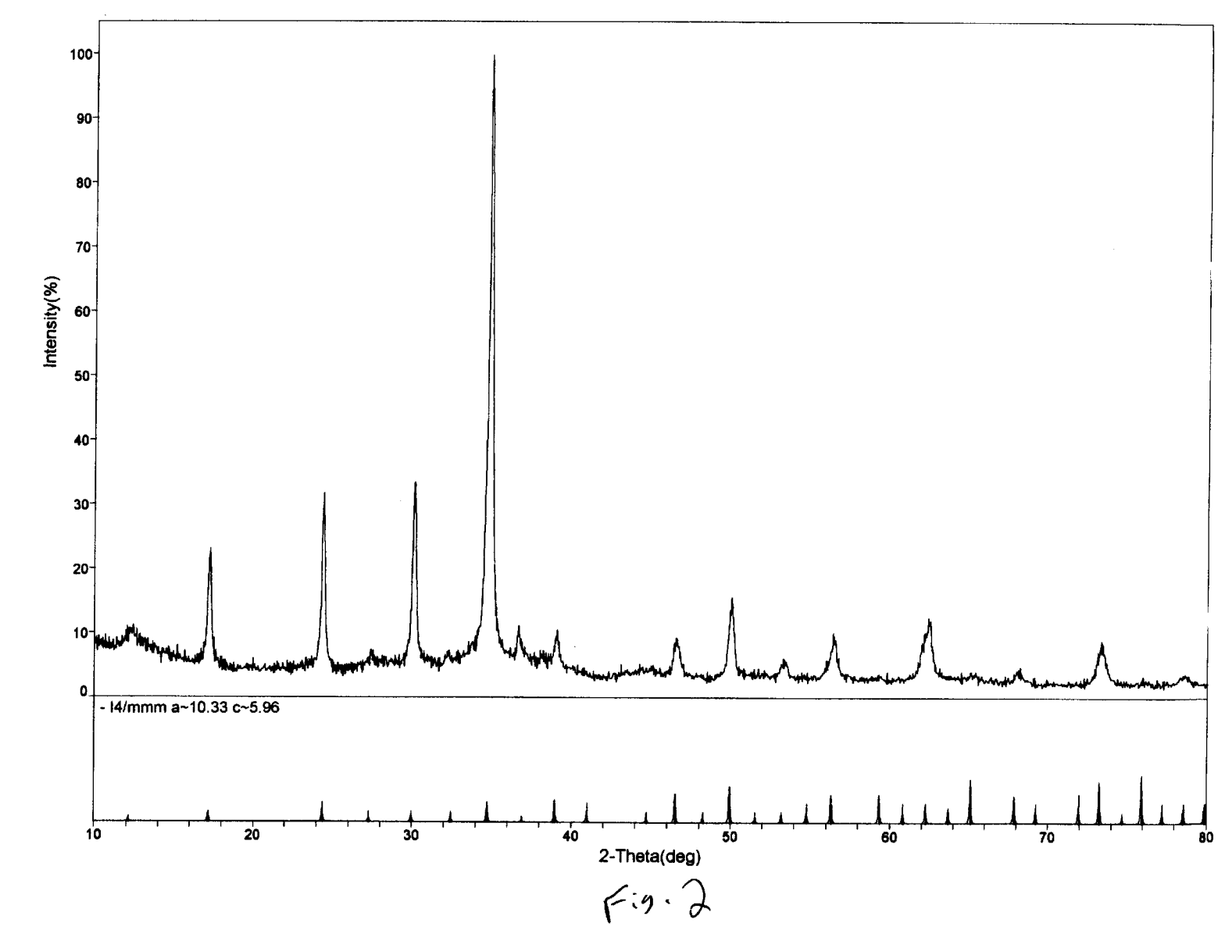
FIGS. 2 is an XRD plot of one alloy according to the instant invention FC-23.
Figure 3:
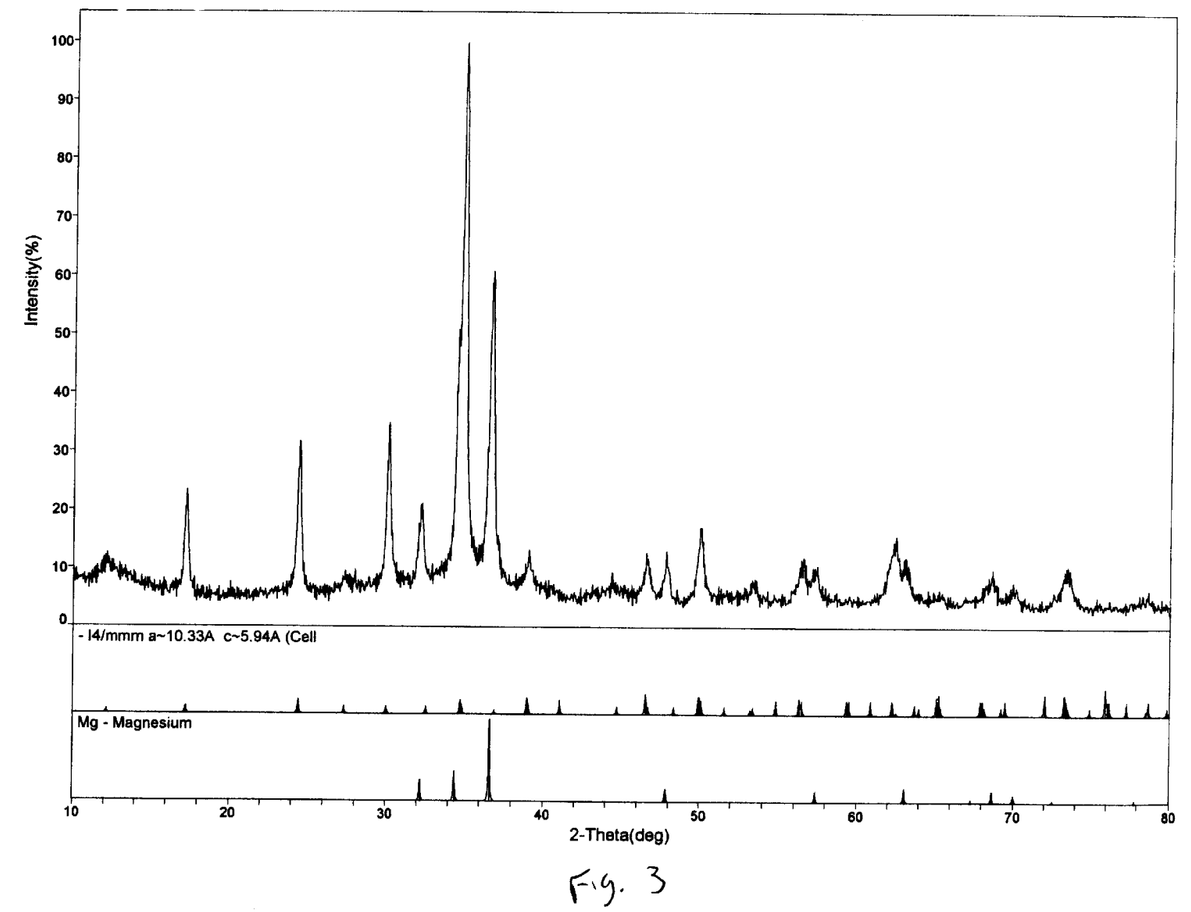
FIGS. 3 is an XRD plot of one alloy according to the instant invention FC-45.

FIGS. 2 and 3 are XRD plots of samples FC-23 and FC-45, respectively. As can be seen these materials do not have much free magnesium at all. The instant alloys have primarily a $Mg_{12}Mm$ (where Mm is Misch metal) structure. It is also worthy to note that no $Mg_2Ni$ structure is seen in the alloys. It is believe that the rapid solidification technique used to make the instant alloys in conjunction with the proper alloying ingredients creates compositional and structural disorder in the materials, thus inhibiting the formation of free Mg and $Mg_2Ni$ components within the alloy.

Figure 4:
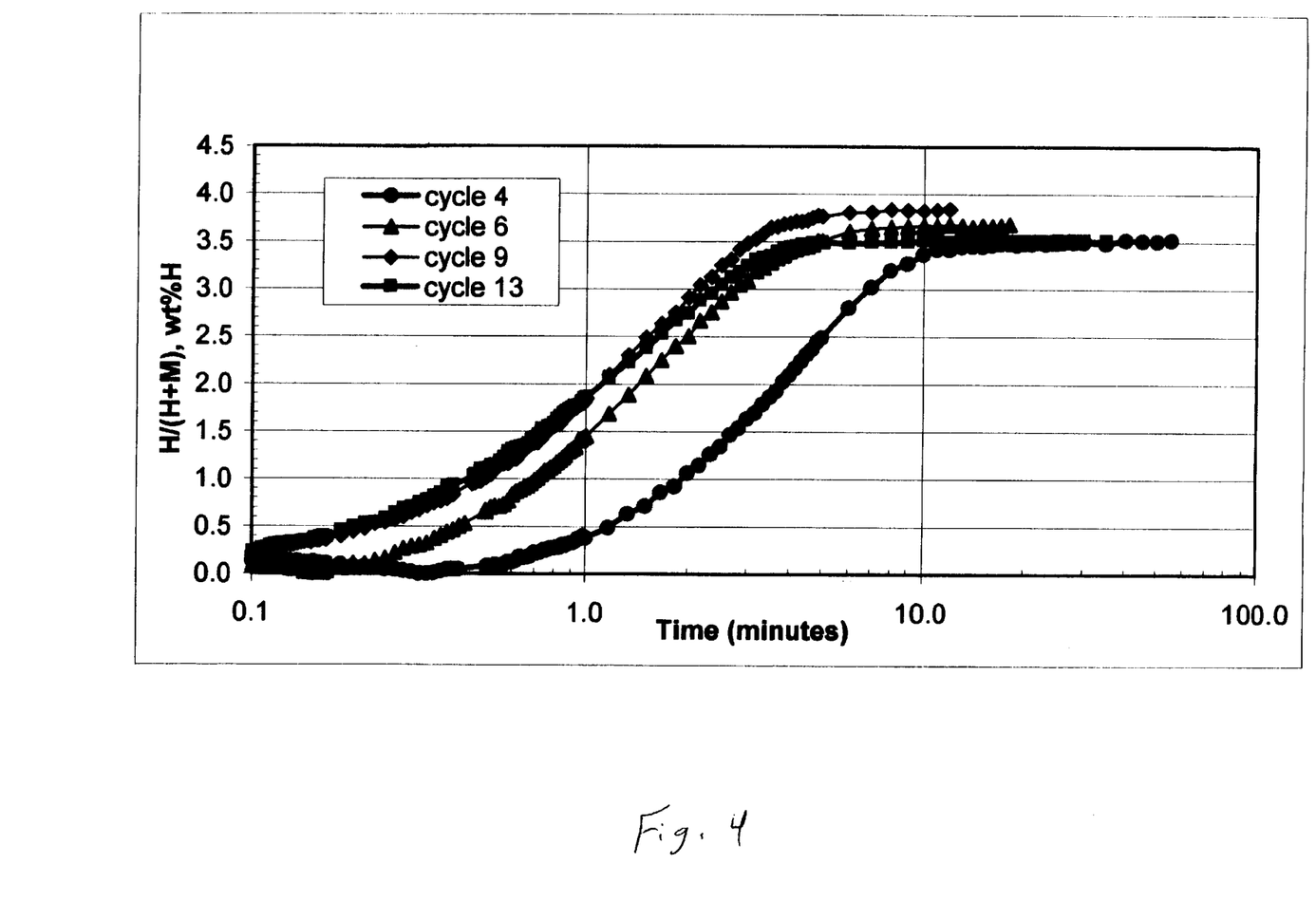
FIG. 4 is a plot of weight percentage hydrogen storage versus time desorption curves at 300° C. for the FC-23 alloy at the $4^{th}$, $6^{th}$, $9^{th}$, and $13^{th}$ cycles.

FIG. 4 is a plot of weight percentage hydrogen storage versus time desorption curves at 300° C. for the FC-23 alloy at the $4^{th}$, $6^{th}$, $9^{th}$, and $13^{th}$ cycles. As once the alloy fully activates, the alloy releases nearly all of the stored hydrogen in less than 10 minutes and about 50% of the stored hydrogen in one minute. This is indeed very good kinetics, particularly when compared with the very long desorption time of pure Mg.

Figure 5:
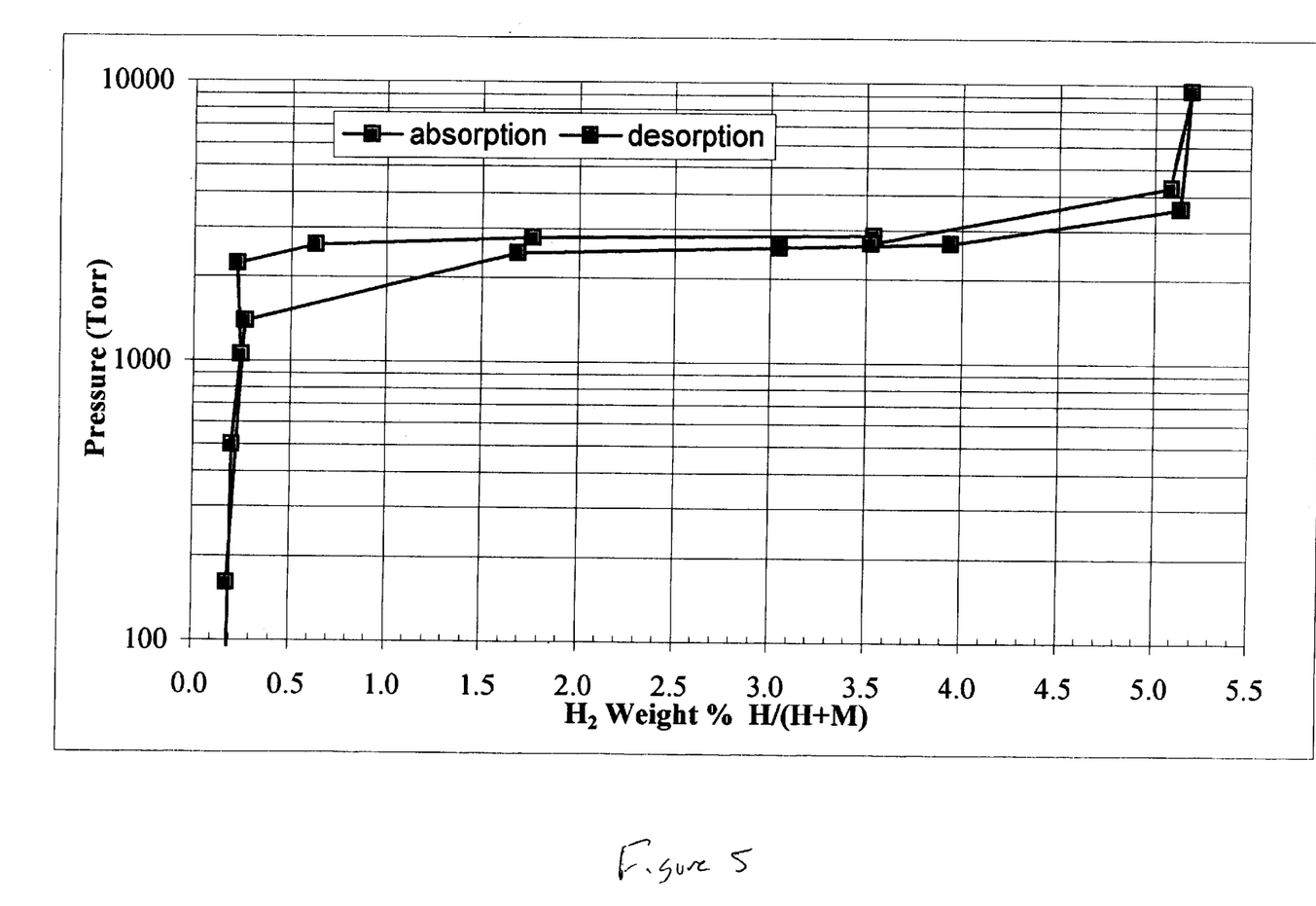
FIG. 5 is a graph of the PCT adsorption and desorption curves at 300° C. for sample FC-45.

FIG. 5 is a graph of the PCT adsorption and desorption curves at 300° C. for sample FC-45. As can be observed, there is no hysteresis in the desorption curve. That is, all of the stored hydrogen is recovered upon desorption. This is in contract to other materials in which a portion of the stored hydrogen is not recoverable.

Figure 6:
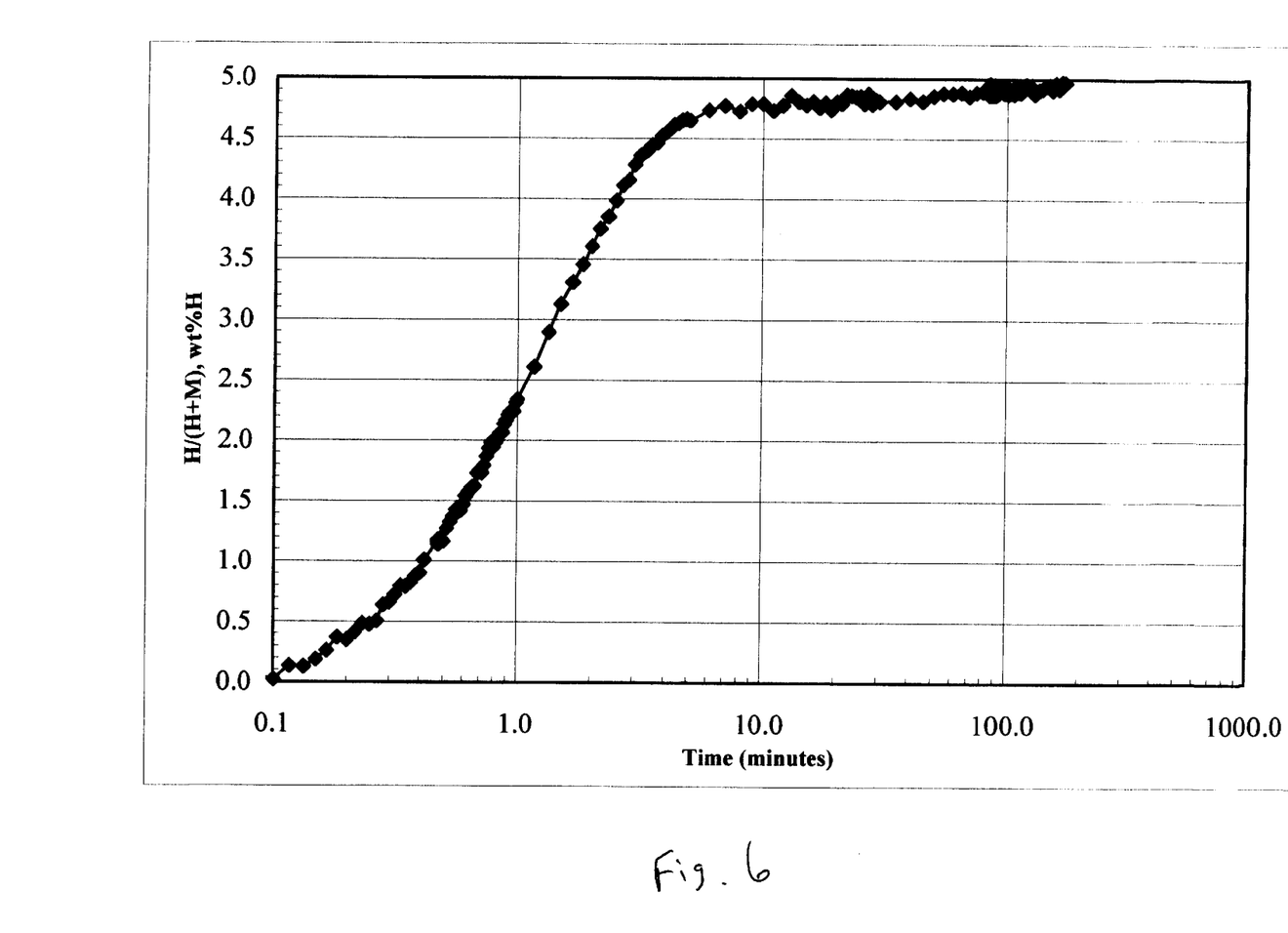
FIG. 6 is a is a plot of weight percentage hydrogen storage versus time adsorption and desorption curves at 300° C. for the FC-45 alloy.

FIG. 6 is a plot of weight percentage hydrogen storage versus time desorption curve at 300° C. for the FC-45 alloy. Once again, the inventive alloy releases nearly all of the stored hydrogen in less than about 10 minutes and about 50% of the stored hydrogen in one minute. Thus, the alloy exhibits very good kinetics, particularly when compared with the very long desorption time of pure Mg.

The present invention includes a metal hydride hydrogen storage means for storing hydrogen within a container or tank. In one embodiment of the present invention, the storage means comprises a the afore described hydrogen storage alloy material physically bonded to a support means. Generally, the support means can take the form of any structure that can hold the storage alloy material. Examples of support means include, but are not limited to, mesh, grid, matte, foil, foam and plate. Each may exist as either a metal or non-metal.

The support means may be formed from a variety of materials with the appropriate thermodynamic characteristics that can provide the necessary heat transfer mechanism. These include both metals and non-metals. Preferable metals include those from the group consisting of Ni, Al, Cu, Fe and mixtures or alloys thereof. Examples of support means that can be formed from metals include wire mesh, expanded metal and foamed metal.

The hydrogen storage alloy material may be physically bonded to the support means by compaction and/or sintering processes. The alloy material is first converted into a fine powder. The powder is then compacted onto the support means. The compaction process causes the powder to adhere to and become an integral part of the support means. After compaction, the support means that has been impregnated with alloy powder is preheated and then sintered. The preheating process liberates excess moisture and discourages oxidation of the alloy powder. Sintering is carried out in a high temperature, substantially inert atmosphere containing hydrogen. The temperature is sufficiently high to promote particle-to-particle bonding of the alloy material as well as the bonding of the alloy material to the support means.

Figure 7:
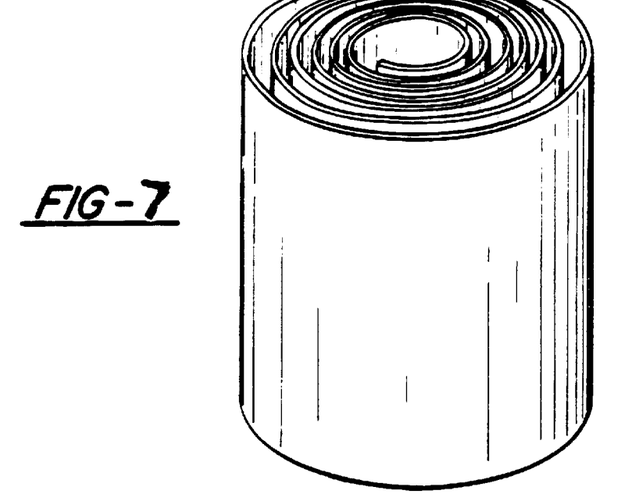
FIG. 7 shows an embodiment of the instant invention where a support means bonded with the hydrogen storage alloy material is spirally wound into a coil.
Figure 8:
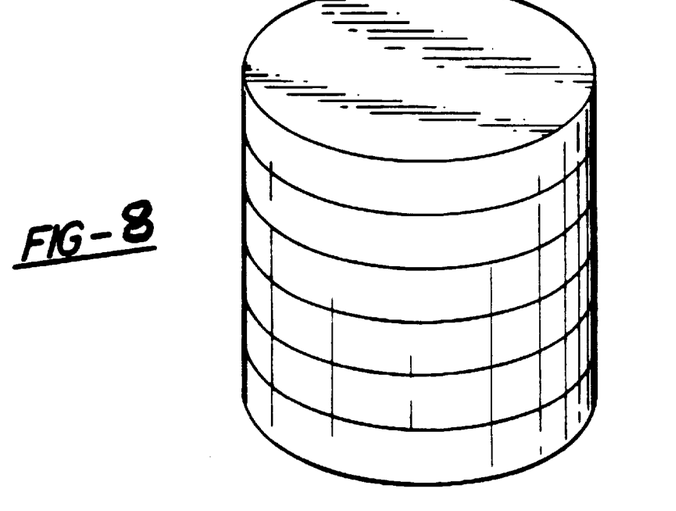
FIG. 8 shows an alternate embodiment of the instant invention where a support means bonded with the hydrogen storage alloy material is assembled as a plurality of stacked disks.

The support means/alloy material can be packaged within the container/tank in many different configurations. FIG. 7 shows a configuration where the support means/alloy material is spirally wound into a coil. FIG. 8 shows an alternate configuration where the support means/alloy material is assembled in the container as a plurality of stacked disks. Other configurations are also possible (e.g. stacked plates).

Compacting and sintering alloy material onto a support means increases the packing density of the alloy material, thereby improving the thermodynamic and kinetic characteristics of the hydrogen storage system. The close contact between the support means and the alloy material improves the efficiency of the heat transfer into and out of the hydrogen storage alloy material as hydrogen is absorbed and desorbed. In addition, the uniform distribution of the support means throughout the interior of the container provides for an even temperature and heat distribution throughout the bed of alloy material. This results in a more uniform rates of hydrogen absorption and desorption throughout the entirety thereof, thus creating a more efficient energy storage system.

One problem when using just alloy powder (without a support means) in hydrogen storage beds is that of of self-compaction due to particle size reduction. That is, during repeated hydriding and dehydriding cycles, the alloy materials expand and contract as they absorb and desorb hydrogen. Some alloy materials have been found to expand and contract by as much as 25% in volume as a result of hydrogen introduction into and release from the material lattice. As a result of the dimensional change in the alloy materials, they crack, undergo fracturing and break up into finer and finer particles. After repeated cycling, the fine particles self-compact causing inefficient hydrogen transfer as well as high stresses that are directed against the walls of the storage container.

However, the processes used to attach the alloy material onto the support means keeps the alloy particles firmly bonded to each other as well as to the support means during the absorption and desorption cycling. Furthermore, the tight packaging of the support means within the container serves as a mechanical support that keeps the alloy particles in place during the expansion, contraction and fracturing of the material.

The instant alloys and storage material systems are useful as hydrogen supplies for many applications. One such application is the field of automobiles. Specifically, the systems can be used as a source of hydrogen for internal combustion engine (ICE) vehicles or fuel cell (FC) vehicles.

Figure 9:
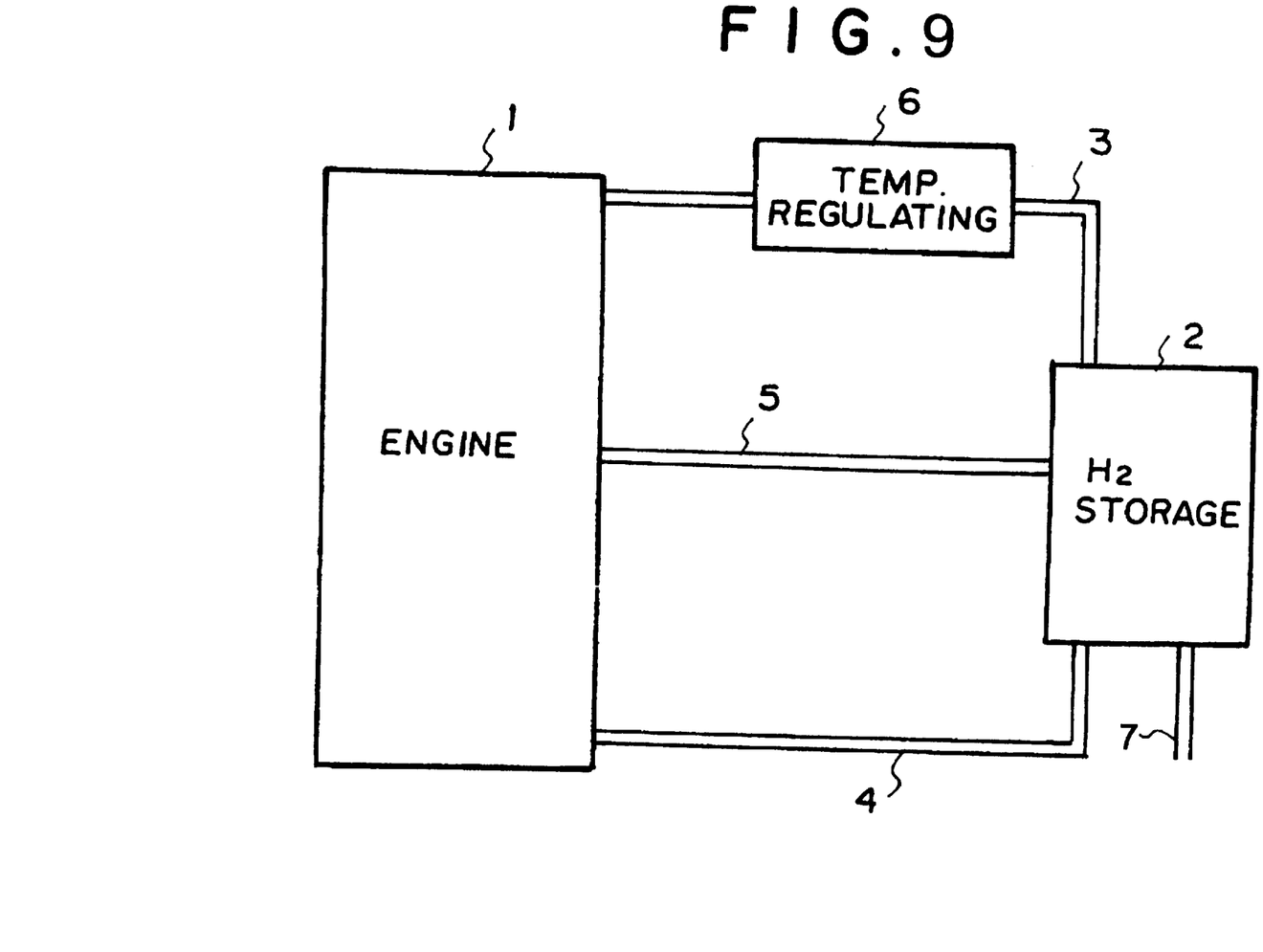
FIG. 9, shows a schematic representation of a hydrogen gas supply system which utilizes the alloy of the instant invention for powering an internal combustion engine vehicle.
Figure 10:
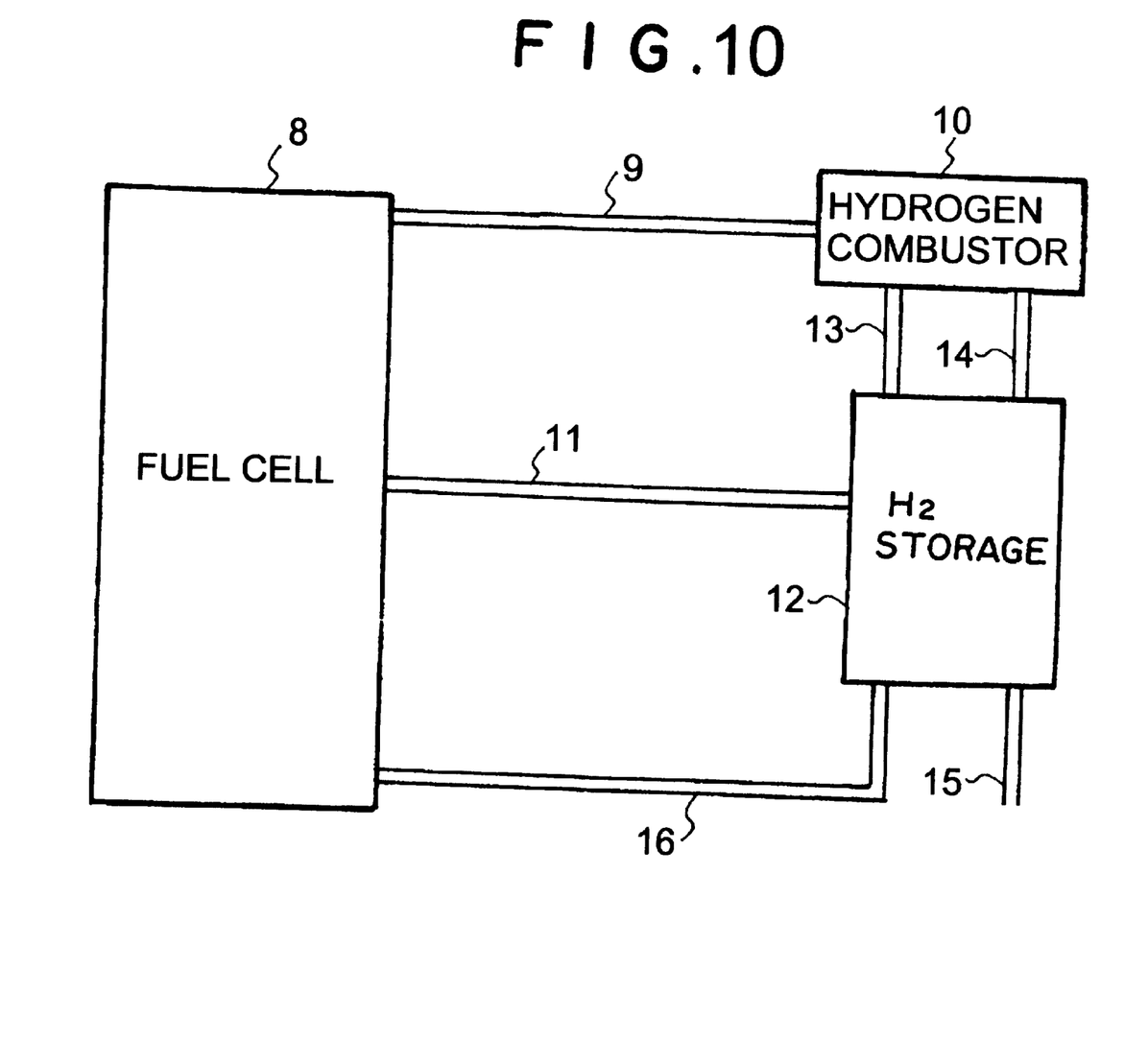
FIG. 10, shows a schematic representation of a hydrogen gas supply system which utilizes the alloy of the instant invention for powering for a fuel cell vehicle.

FIG. 9, shows a schematic representation of a hydrogen gas supply system for an ICE vehicle, which is for supplying a hydrogen engine 1 with hydrogen gas. The system has a hydrogen gas storage portion 2 and an engine waste heat transfer supply passage 3 which leads engine waste heat (in the form of exhaust gas or engine coolant) discharged from the engine 1 to the hydrogen gas storage portion 2. The system also includes a return passage 4 for returning any engine coolant used to heat the hydrogen storage material back to the engine 1 and an exhaust gas vent 7 for releasing used exhaust gas. The system further includes a hydrogen gas supply passage 5 which leads hydrogen gas from the hydrogen gas storage portion 2 to the engine 1. The engine waste heat transfer supply passage 3 is provided with a temperature regulating portion 6 which regulates the temperature of the waste heat to be introduced into the hydrogen gas storage portion 2. With such a system, waste heat generated within the ICE can be efficiently used to heat the hydrogen storage material to release hydrogen therefrom for use in the ICE.

FIG. 9, shows a schematic representation of a hydrogen gas supply system for an FC vehicle, which is for supplying a fuel cell 8 with hydrogen gas. The system has a hydrogen gas storage portion 12 and a fuel cell waste heat/hydrogen transfer supply passage 9 which leads fuel cell waste heat and unused hydrogen discharged from the fuel cell 8 to a hydrogen gas combustor 10. Waste heat from the fuel cell may be in the form of heated gases or heated aqueous electrolyte. The hydrogen combustor 10, heats a thermal transfer medium (preferably in the form of the aqueous electrolyte from the fuel cell) utilizing waste heat from the fuel cell 8, and by combusting hydrogen. Hydrogen is supplied to the combustor 10 via unused hydrogen from the fuel cell 8, and via fresh hydrogen supplied from the hydrogen storage unit 12 via hydrogen supply line 14. Heated thermal transfer medium is supplied to the hydrogen storage unit 12 via supply line 13. The system also includes a return passage 16 for returning any fuel cell aqueous electrolyte used to heat the hydrogen storage material back to the fuel cell 8 and an exhaust gas vent 15 for releasing used combustor gas. The system further includes a hydrogen gas supply passage 11 which leads hydrogen gas from the hydrogen gas storage unit 12 to the fuel cell 8.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A magnesium hydrogen storage alloy, said alloy comprising at least 85 atomic percent magnesium, said alloy having a hydrogen storage capacity of at least 4 weight percent and a plateau pressure of at least 2000 Torr at 300° C.

2. The magnesium hydrogen storage alloy of claim 1, wherein said alloy additionally contains about 2–8 atomic percent Ni.

3. The magnesium hydrogen storage alloy of claim 2, wherein said alloy additionally contains about 0.5–3 atomic percent Al.

4. The magnesium hydrogen storage alloy of claim 3, wherein said alloy additionally contains about 2–7 atomic percent rare earth metals or mixtures of rare earth metals.

5. The magnesium hydrogen storage alloy of claim 4, wherein said rare earth elements are Misch metal.

6. The magnesium hydrogen storage alloy of claim 5, wherein said Misch metal comprises predominantly Ce and La.

7. The magnesium hydrogen storage alloy of claim 6, wherein said alloy additionally contains about 0.5–5 atomic percent Si.

8. The magnesium hydrogen storage alloy of claim 1, wherein said alloy has a hydrogen storage capacity of greater than 4.5 weight percent.

9. The magnesium hydrogen storage alloy of claim 8, wherein said alloy has a hydrogen storage capacity of greater than 5 weight percent.

10. The magnesium hydrogen storage alloy of claim 1, wherein said alloy further comprises about 2–8 atomic percent nickel, about 0.5–5 atomic percent aluminum and about 2–7 atomic percent rare earth metals or mixtures of rare earth metals.

11. The magnesium hydrogen storage alloy of claim 10, wherein said rare earth elements are Misch metal.

12. The magnesium hydrogen storage alloy of claim 11, wherein said Misch metal contains predominantly Ce and La.

13. The magnesium hydrogen storage alloy of claim 12, wherein said alloy further contains about 0.5–5 atomic percent silicon.

14. The magnesium hydrogen storage alloy of claim 1, wherein said alloy comprises 89.10 at. % Mg, 4.37 at. % Ni, 1.35 At. % Al, and 5.19 at % Mm, wherein Mm is Misch metal.

15. The magnesium hydrogen storage alloy of claim 14, wherein said Misch metal comprises 1.78 at. % La, 2.54 at. % Ce, 0.50 at. % Nd and 0.37 at. % Pr within said Mg alloy.

16. The magnesium hydrogen storage alloy of claim 1, wherein said alloy comprises 90.04 at. % Mg, 4.12 at. % Ni, 1.24 at. % Al, 1.00 at. % Si and 3.59 at % Mm wherein Mm is Misch metal.

17. The magnesium hydrogen storage alloy of claim 16, wherein said Misch metal comprises 1.55 at. % La, 1.71 at. % Ce, 0.30 atomic % Pr, and 0.03 at. % Nd within the Mg alloy.

18. The magnesium hydrogen storage alloy of claim 1, wherein said hydrogen storage alloy is in powder form.

19. The magnesium hydrogen storage alloy of claim 18, wherein said hydrogen storage alloy powder is physically bonded to a support means to form a hydrogen storage means.

20. The magnesium hydrogen storage alloy of claim 19, wherein hydrogen storage alloy powder is physically bonded to said support means by compaction and/or sintering.

21. The magnesium hydrogen storage alloy of claim 19, wherein said support means comprises at least one selected from the group consisting of mesh, grid, matte, foil, foam and plate.

22. The magnesium hydrogen storage alloy of claim 19, wherein said support means is formed from a metal.

23. The magnesium hydrogen storage alloy of claim 22, wherein said support means is formed from one or more metals selected from the group consisting of Ni, Al, Cu, Fe and mixtures or alloys thereof.

24. The magnesium hydrogen storage alloy of claim 19, wherein said hydrogen storage means comprises said hydrogen storage alloy powder physically bonded to said support means and spirally wound into a coil.

25. The magnesium hydrogen storage alloy of claim 19, wherein said hydrogen storage means comprises said hydrogen storage alloy powder physically bonded to said support means, a plurality of which are stacked as disks or plates.

26. The magnesium hydrogen storage alloy of claim 24, wherein said hydrogen storage means supplies hydrogen to an internal combustion engine to power a vehicle.

27. The magnesium hydrogen storage alloy of claim 25, wherein said hydrogen storage means supplies hydrogen to an internal combustion engine to power a vehicle.

28. The magnesium hydrogen storage alloy of claim 24, wherein said hydrogen storage means supplies hydrogen to a fuel cell to power a vehicle.

29. The magnesium hydrogen storage alloy of claim 25, wherein said hydrogen storage means supplies hydrogen to a fuel cell to power a vehicle.

30. The magnesium hydrogen storage alloy of claim 1, wherein said magnesium based hydrogen storage alloy supplies hydrogen to an internal combustion engine to power a vehicle.

31. The magnesium hydrogen storage alloy of claim 1, wherein said magnesium based hydrogen storage alloy supplies hydrogen to a fuel cell to power a vehicle.

* * * * *